(12) United States Patent
Bellekens et al.

(10) Patent No.: US 7,215,865 B2
(45) Date of Patent: May 8, 2007

(54) ENVELOPE FOR OPTICAL FIBRES

(75) Inventors: Kathleen Bellekens, Winksele-Delle (BE); Paul Meurs, Leuven (BE); Freddy Vanwinkel, Kersbeek-Miskom (BE)

(73) Assignee: Tyco Electronics Raychem NV (BE)

( * ) Notice: Subject to any disclaimer, the term of this patent is extended or adjusted under 35 U.S.C. 154(b) by 216 days.

(21) Appl. No.: 10/514,694

(22) PCT Filed: May 7, 2003

(86) PCT No.: PCT/GB03/01955

§ 371 (c)(1),
(2), (4) Date: Nov. 17, 2004

(87) PCT Pub. No.: WO03/098306

PCT Pub. Date: Nov. 27, 2003

(65) Prior Publication Data

US 2005/0213918 A1    Sep. 29, 2005

(30) Foreign Application Priority Data

May 20, 2002   (GB)   ................................ 0211517.8

(51) Int. Cl.
*G02B 6/00* (2006.01)
(52) U.S. Cl. ...................................... 385/135
(58) Field of Classification Search .................... None
See application file for complete search history.

(56) References Cited

U.S. PATENT DOCUMENTS 4,468,089 A    8/1984  Brorein .................... 350/96.23
4,954,670 A *  9/1990  Jensen et al. ................. 174/92
5,562,295 A    10/1996 Wambeke et al. ............. 277/34
5,754,724 A    5/1998  Bechamps et al.
6,161,688 A    12/2000 Weber ..................... 206/213.1

FOREIGN PATENT DOCUMENTS

| EP | 0 055 231 | 6/1982 |
| EP | 0 328 386 | 8/1989 |
| EP | 1 505 765 | 11/2000 |
| JP | 2000292642 | 10/2000 |
| WO | 94/18815 | 8/1994 |

OTHER PUBLICATIONS

International Search Report for PCT/GB 03/01955.
International Preliminary Examination Report for PCT/GB03/01955.
GB Search Report for 0211517.8 dated Sep. 30, 2002.

* cited by examiner

*Primary Examiner*—Sung Pak
*Assistant Examiner*—Hoang Tran
(74) *Attorney, Agent, or Firm*—Myers Bigel Sibley & Sajovec

(57) ABSTRACT

Enclosure and method for sealingly enclosing a space into and/or from which at least one optical fibre is fed to connect to at least one optical component, by providing a flexible protective sheet of substantially moisture resistant material having a pair of sealing strips; and folding and sealing the sheet around the optical component to provide an envelope enclosing the component with the optical fibre(s) sealed between the sealing strips. The invention also concerns an enclosure into and/or from which the optical fibres pass through an aperture which is sealed by all adherent patch or flap with the fibres sealed between the exterior surface of the enclosure and an overlying portion of the patch or flap.

12 Claims, 4 Drawing Sheets

ENVELOPE FOR OPTICAL FIBRES

RELATED APPLICATIONS

The present application is a National Phase application of PCT/GB03/01955 filed on May 7, 2003 and published in English, which claims priority from Application GB 0211517.8 filed on May 20, 2002, the disclosures of which are hereby incorporated by reference.

FIELD OF THE INVENTION

The present invention relates to optical fibre sealing. More in particular, the present invention relates to a method of and a device for sealingly enclosing a space into which one or more optical fibres are fed.

BACKGROUND OF THE INVENTION

It is well known that moisture has adverse effects on the properties of optical components. The split ratio of optical splitters, for example, may be influenced by the presence of moisture, and in optical connectors moisture may lead to increased losses. The sealing of optical components against moisture and other environmental influences, in other words environmental sealing, is therefore highly desirable.

It has been proposed to environmentally seal individual optical components. This is, however, expensive and not always effective.

In the case of electrical components it is known to seal an entire circuit by enclosing it in a flexible, moisture-resistant bag. WO 94/18815 (Ericsson), for example, discloses a casing for flexibly enclosing electronic circuitry. The casing comprises a laminate consisting of metal and plastic sheets. Two sheets of laminate are joined to form an envelope in which electronic circuitry may be accommodated. Electrical conductors pass through the joint region of the laminate.

Although such an arrangement may be effective for sealing electronic circuits, it is less suitable for optical components or circuits. The applicant has found that optical fibres, unlike electrical conductors such as copper wires, should not be passed through the joint region of the laminate without additional measures. Copper wires (or other electrical conductors) may be bent under almost any angle without affecting their conductive properties. Optical fibres however, while being more flexible than copper wires, should not be bent under the minimum bending radius at which light losses occur (usually approximately 3 cm), and certainly not under the minimum bending radius at which they suffer permanent damage. In addition, optical fibres are made of glass which has different sealing properties to metal.

The applicant's earlier GB patent application No. 0110366.2 discloses a method of sealingly enclosing a space into which optical fibres are fed by a accommodating a portion of at least one optical fibre between two sealing strips and applying pressure or heat to the strips to sealingly enclose the fibre, followed by the step of placing the seal formed by the sealing strips in the opening of a container and applying heat and/or pressure to the container to seal the opening onto the strips. This method is particularly suitable for providing a moisture resistant container enclosing at least one optical component with fibres fed through the seal for optically connecting the enclosed component with other components on the exterior of the enclosure.

One disadvantage associated with this method of sealing is that the fibre or fibres are fed into the enclosed space along an edge of the container. The fibre or fibres extend substantially perpendicular with respect to the longitudinal direction of the sealed edge such that he fibres extend perpendicularly from and with respect to the sealed edge of the enclosure: This can be particularly disadvantageous in applications where there is a requirement to route the fibre back over the surface of the enclosure, for example when storing the enclosure and fibre ends in a fibre optic organiser tray or in a tray type container closed by a closure member in the form of an organiser tray, since the fibre must have a minimum bend radius which results in the fibre extending beyond the edges of the enclosure.

There is a requirement therefore for a method of sealingly enclosing a space into which at least one optical fibre is fed which avoids the problem of the fibre exiting a sealed edge of a sealed enclosure, and a further requirement for a more compact enclosure where the fibre ends can be stored on the surface of the enclosure without extending beyond the edges thereof.

SUMMARY OF THE INVENTION

According to a first aspect of the invention there is a method of sealingly enclosing a space into which at least one optical fibre is fed; the method comprising the steps of:
  providing at least one optical component connected to optical fibre(s);
  providing a flexible protective sheet having a pair of sealing strips at or towards opposite ends thereof;
  arranging the said optical component(s) on the said sheet;
  folding the said ends of the sheet over the said optical component to provide an envelope surrounding the said component(s) with the said sealing strips arranged in overlapping engagement on one side of the envelope with the optical fibre(s) being fed into the interior of the said envelope between the sealing strips;
  applying heat and/or pressure to the said sealing strips so as to provide a sealed seam along one surface of the envelope sealingly enclosing the fibre(s); and
  sealing the sides of the envelope to provide a sealed enclosure.

The term "side is used herein to refer to the two main surfaces of the sheet from which the enclosure envelope is formed, and to refer to the two main external surfaces of a relatively flat envelope formed from the sheet, bearing in mind that at some stages of its formation the envelope may not be truly flat, but the surfaces in question can still notionally be identified By folding the ends of the sheet such that the sealing strips are arranged in overlapping engagement on one side of the envelope the optical fibres can be readily fed into the interior of the envelope between the sealing strips on the side of the envelope and bent on that side of the envelope without extending beyond the envelope edges. This is particularly advantageous where there is a requirement to loop fibre ends for storage on one side of the envelope for subsequent connection to other components or to route the fibres over one side of the envelope for connection with other components, for example for connection with other components in an optical circuit organiser tray.

Preferably the sealing strips are provided on opposite sides of the sheet, and the end of the sheet are folded over the components along substantially parallel respective fold lines. In this way it is possible to form the envelope by folding the sheet along two parallel fold lines. By having the sealing strips on opposite sides of the sheet before folding the ends can be brought together in an overlapping arrangement with the sheet ends pointing in opposite directions to provide a sealed seam on one side of the envelope.

In an alternative embodiment, the said sealing strips are provided on the same side of the said sheet, and the ends of the sheet are folded along substantially parallel fold lines and brought together to form an overlapping apex butt joint with the sheet ends pointing in the same direction, and folding the said apex substantially flat against the said surface. In this arrangement heat and/or pressure can be applied to the overlapping ends of the sheet forming the apex in such a way that the application of pressure and/or heat to the component in the envelope can be avoided. By further folding the sheet along both its edges containing the sealing strips it is possible for the sealing strips to be positioned on the same side of the sheet before folding so that pressure can be applied to the overlapping sealing strips in a plane substantially perpendicular to the plane of the envelope.

Preferably, the said fibre(s) is/are arranged on the said sheet with bends in the fibre and a straight section between the bends, and the said sheet is folded at a first end along a fold line coincident with the straight section(s) of fibre only. In this way the lengths of fibre that are enclosed by the seal can be turned through an angle of 180° or so when the end of the sheet is folded along the fold line coincident with the straight section of fibres. This rotation of the fibres is accommodated by twisting of the fibres along the straight section such that the straight section of fibre behaves as a hinge.

In preferred embodiments the fibre(s) is/are arranged with a 90° bend in the region between the seam and the fold line at the said first end. This readily permits the fibres to be arranged perpendicularly with respect to the sealing strips as they are fed into the enclosure on the side of the envelope.

Preferably the said sheet is folded such that the said seam is positioned substantially towards the centre of the said side surface of the envelope or towards one folded side edge thereof such that the side surface of the envelope over which the fibre(s) is/are fed into the envelope is of sufficient shape and size to accommodate the minimum bend radius of the overlying fibre(s). This is particularly important where the fibre(s) is/are to be routed over the surface on the side of the envelope where they are fed into the envelope, for example in applications where it is desirable to locate sealed optical components in an optical organiser tray or in a tray type container closed by an organiser tray with fibres fed into the enclosure connecting the component(s) for optical connection with other components on the exterior of the enclosure.

Preferably the said area is of sufficient shape and size to accommodate loops of fibre(s). This is particularly advantageous where is desirable to provide lengths of free fibre for connecting the enclosed component to other optical components.

In preferred embodiments the said sheet is folded such that the distance between the seam and the respective fold line of the sheet towards which the fibres are fed is sufficient to accommodate the minimum bend radius of the fibre(s). This readily enables the fibre to be bent through an angle of 90° in the region between the seam and the fold line at the aforementioned first end of the envelope. In this way the fibre can be routed from the straight section to the sealed seam so that it is aligned perpendicularly with the sealing strips where it is fed into the enclosure.

In preferred embodiments the sheet comprises a laminate, and preferably the laminate comprises a moisture resistant layer in combination with the sealed seam. The moisture resistant layer can provide a substantially moisture resistant enclosure for enclosing the optical component. It is preferable that the moisture resistant layer is provided by a layer of aluminium. Preferably the said component(s) are arranged on a support and the fibre(s) is/are routed in accordance with a predetermined circuit configuration with fibre end(s) fed through the envelope for optical connection with other components. This allows for prefabrication of the optical component and fibres which allows for automation of the circuit assemble, and quick and simple installation within the enclosure.

In preferred embodiments the fibre(s) is/are fixed with respect to the said support.

In another aspect the invention further provides an enclosure enclosing at least one optical component into which at least one optical fibre is fed, produced by the above method.

According to a further aspect of the invention there is an enclosure enclosing at least one optical component and into which at least one optical fibre is feed; the said enclosure comprising; a flexible bag like container of substantially moisture resistant material enclosing the said component and portions of at least one optical fibre leading from the said component, and a substantially moisture resistant seam seal on one side of the container through which the said fibre is fed.

In another aspect the invention provides a kit-of-parts form forming a sealed enclosure in accordance with the method and end enclosure defined above.

A further variation, applicable to any arrangement where optical components are sealed in an enclosure, preferably at least partly sealed by a flexible sheet, involves the optical fibres entering and/or leaving the enclosure through a window or aperture having an adherent patch or flap with the fibres sealed between the patch and a portion of the enclosure wall. Preferably, the enclosure consists of or is sealed by a polymeric film and the patch is made of polymeric film, preferably the same as that of the enclosure seal.

BRIEF DESCRIPTION OF THE DRAWINGS

Various embodiments of the invention will now be more particularly described, by way of example only, with reference to the accompanying drawings, in which.

DETAILED DESCRIPTION OF EMBODIMENTS OF THE INVENTION

Figure 1A:
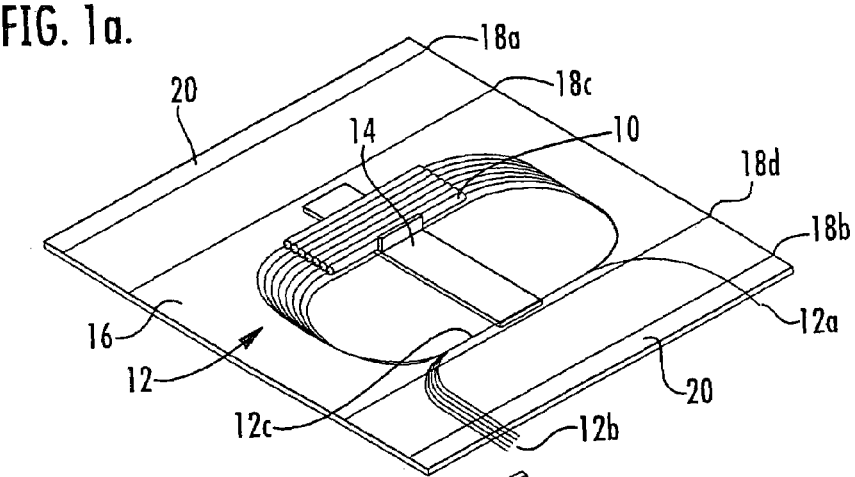
FIGS. 1a to 1d are perspective views showing an enclosure for an optical component at various stages of production.

Referring to FIG. 1, a sealed enclosure for an optical component or components into which at least one optical fibre is fed is produced according to a first embodiment of the invention with reference to FIGS. 1a to 1d. In FIG. 1a an optical component comprising an array of splitters 10 and connected optical fibres 12 is mounted on a base plate support 14 with in-going fibres 12a and outgoing fibres 12b arranged in mirrored substantially S-shaped routes with straight sections 12c extending substantially parallel to the splitters 10 at the opposite end of the support 14. The arrangement of the optical component, fibres and support may be as described in the applicant's earlier GB patent application number 0129906.4. In FIG. 1a the optical component assembly is arranged on a flexible laminate sheet 16. The laminate sheet includes a moisture resistant barrier layer which is preferably made of aluminium. The laminate may be of the type used in Raychem's TDUX(™) products, as disclosed in EP 0579641 and other patents. When properly sealed, such a laminate has extremely low water vapour transmission rate (WVTR).

The sheet 16 is provided with four parallel fold lines 18a, 18b, 18c and 18d which extend substantially parallel to the longitudinal direction of the optical splitters 10 and straight lengths of optical fibre 12c. The first pair of fold lines 18a, 18b extend close to the edges at opposite ends of the sheet while the second pair of fold lines 18c,18d are positioned approximately midway between the edges and a notional parallel centre line of the sheet. The upper surface of the sheet 16 (as shown in the drawings of FIG. 1a) is provided with a pair of sealing strips 20 in the region between the fold lines 18a, 18b and the respective edges of the sheet. It will be understood therefore that the sealing strips extend parallel to the fold lines on opposite ends of the sheet. The sealing strips 20 are preferably made of plastic which is sensitive to heat and/or pressure.

In the arrangement of FIG. 1a the in and outgoing fibres 12a and 12b are bent through 90° between the fold lines 18b, 18d at one end of the sheet and then run substantially parallel along the fold line 18d along the section 12c and are then routed through a 180° bend where they connect with a respective end of a respective splitter 10. In the section 12c the fibres are secured to the support 14 by adhesive or other means.

Figure 1B:
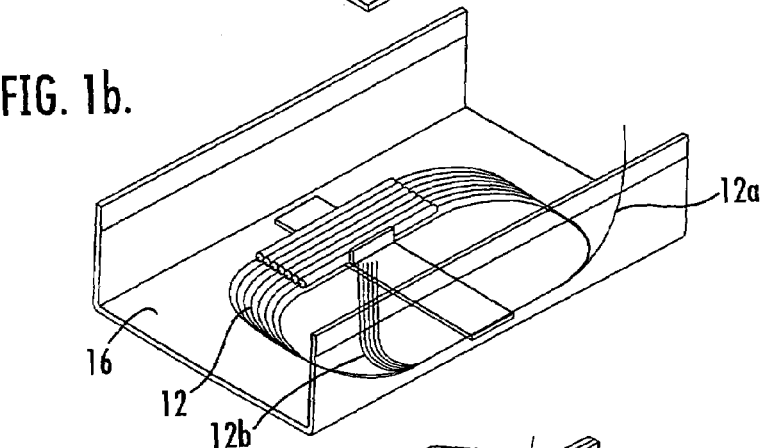
Figure 1C:
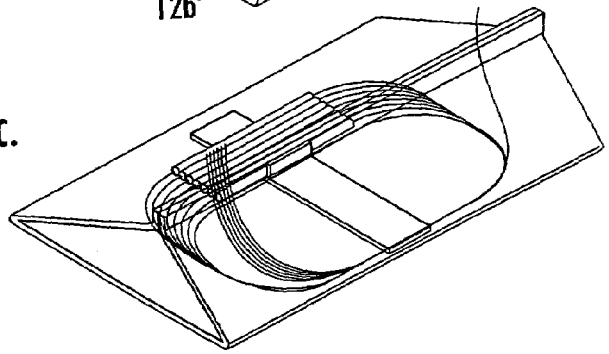
Figure 1D:
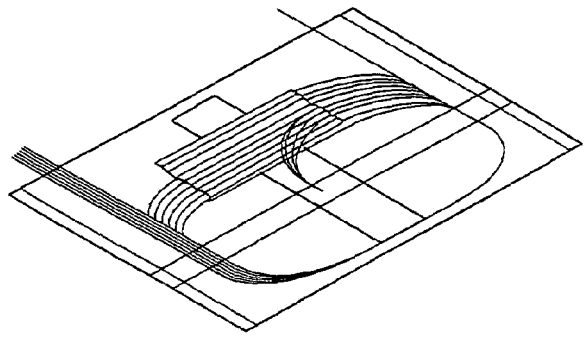

In the position of FIG. 1a the in and outgoing fibres between the fold lines 18b, 18d are biased to lie flat against the 180° sections of fibre between the splitter array and the straight section 12cas shown in FIG. 1d. The straight sections of fibre 12c are held in torsion when in the position of FIG. 1a.

The optical components and fibres are enclosed within an envelope formed by folding and sealing the laminar sheet in accordance with the steps shown in FIGS. 1b to 1d. In FIG. 1b the laminar sheet 16 is first folded along its fold lines 18c, 18d so that the end portions of the sheet are turned through approximately 90° about the respective fold lines 18c, 18d. The in and outgoing fibres 12a, 12b overlying this part of the sheet are also rotated with the end of the sheet. In FIG. 1c the ends of the sheet are further rotated about their respective fold lines 18c, 18b until the sealing strips 20 engage one another with sections of the in and outgoing fibres arranged between the strips. The sheet is then further folded along the fold lines 18a and 18b such that an overlapping seam is formed along the length of the sealing strips with the sealing strips arranged at the apex of a triangular cross-section enclosure with the respective ends of the sheet between the fold lines 18a, 18c and 18c, 18b being inclined with respect to the central part of the sheet between the fold lines 18c, 18d. In the position of FIG. 1c the sealing strips are arranged in a plane substantially perpendicular to the plane of the central part of the sheet and are positioned above the optical components within the envelope being formed. In this position heat and/or pressure, preferably both, is applied to the sealing strips causing the strips to change shape and to sealingly surround the fibres as described in the applicant's earlier GB patent application number 0110366.2. When made of plastic, the sealing strips may melt slightly, resulting in a good mutual bond and a good bonding with the sections of optical fibre positioned between the strips.

When sealing of the apex seam is completed the sealed seam is rotated about the fold lines 18a, 18b and the end sections of the sheet are folded flat against the components enclosed within the envelope and the central section of the sheet as shown in FIG. 1d. In this position the in and outgoing fibres 12a, 12b lying across the end section between the fold lines 18d, 18b in FIG. 1a lie substantially flat within the enclosure with the sections of fibre on the other side of the seal extending flat along the surface on the side of the envelope having the fibre seam seal. The envelope is then sealed along its open side edges by the application of heat and/or pressure to seal the enclosed space within the envelope containing the optical circuit and sections of fibre.

Figure 3:
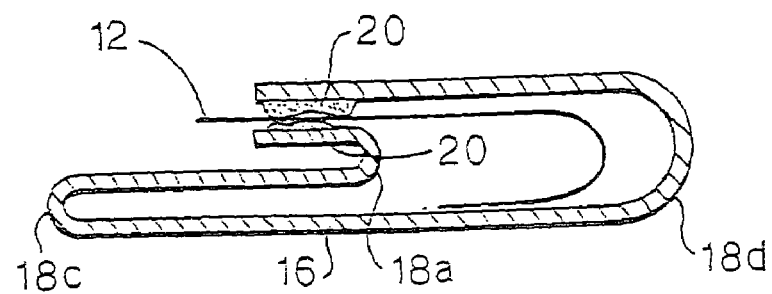
FIG. 3 is a cross-section view of the enclosure FIG. 1d.

A schematic cross-section showing the sealed enclosure of FIG. 1d is shown in FIG. 3. In FIG. 3 it can be seen that the position of the fold line 18a is not entirely critical and may be positioned slightly away from the sealing strip 20 along the respective edge of the sheet.

Referring now FIG. 2a to 2d, in another arrangement the sealing strips 20 are arranged on opposite sides of the laminate sheet 16 so that only two fold lines are required to form a sealed seam along the surface of one side of the envelope enclosure. In the method of FIGS. 2a to 2d the end of the sheet opposite that comprising the overlying fibre sections 12a, 12b is folded along the fold line 18c by approximately 180° to overlie the splitters 10 and part of the fibres and support 14. The overlying fibres in the region between the fold line 18d and the sealing strip 20 at the other end of the sheet are then folded independently of the sheet to overlie the sealing strip 20 on the folded side of the sheet. The other end of the sheet is then folded along the fold line 18d to enclose the bent fibre sections. The sealing strips 20 are then brought into engagement with sections of the ingoing and outgoing fibres arranged between the strips such that they are sealingly enclosed by the application of heat and/or pressure to the sealing strips as previously described. It will be understood in this arrangement the enclosed components and fibres can be protected from the effects of the applied pressure and heat by the provision of a suitable support on the interior side of the envelope to prevent damage to the components during sealing. As in the previously described embodiment the sides of the envelope can there be sealed to provide a fully sealed enclosure containing optical components.

FIG. 3 shows a schematic cross-section of the sealed enclosure of FIG. 1d with the sealing strips positioned on the same sides of the laminar sheet.

Figure 2A:
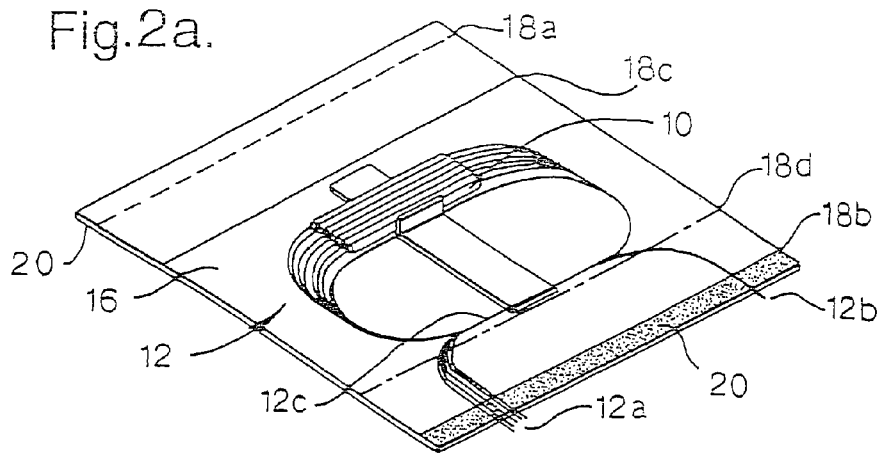
FIGS. 2a to 2d are perspective views similar to those of FIGS. 1a to 1d showing the various stages of producing an enclosure according to a different arrangement to FIGS. 1a to 1d.
Figure 2B:
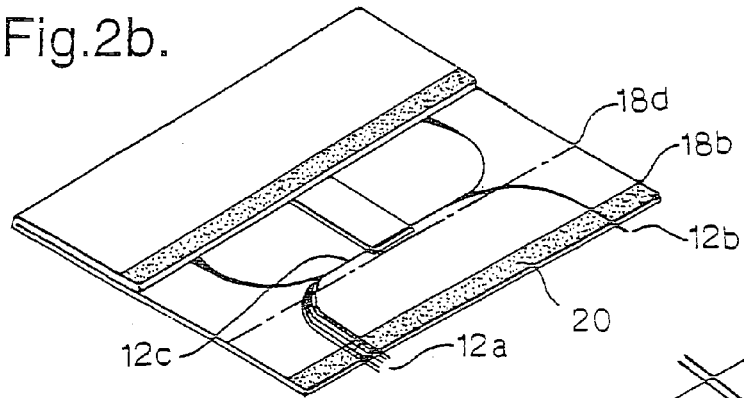
Figure 2C:
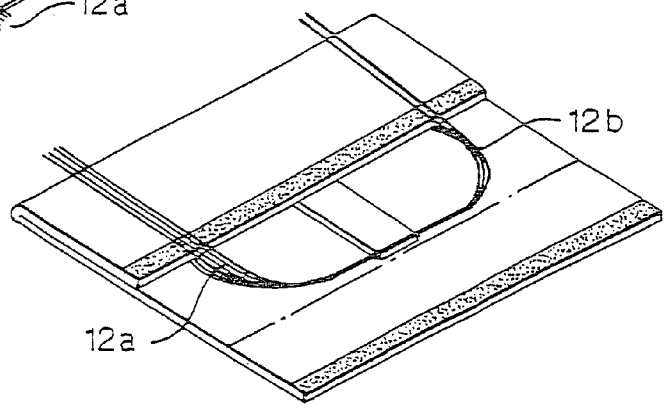
Figure 2D:
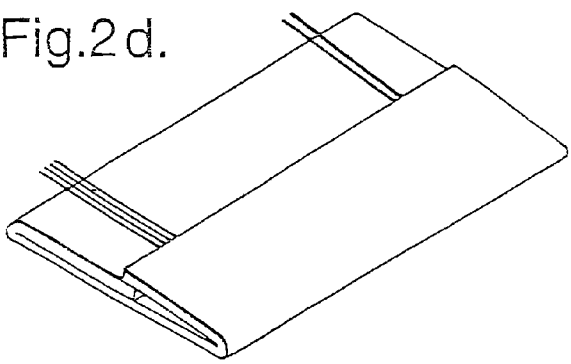
Figure 4:
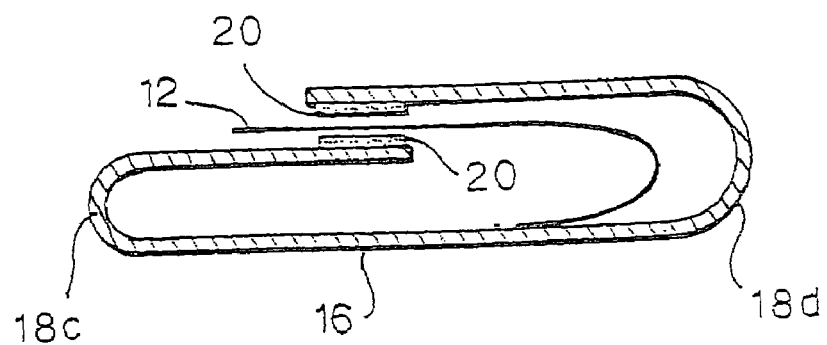
FIG. 4 is a cross-section view of the enclosure of FIG. 2d.

FIG. 4 is a similar cross-section view to that of FIG. 3, but of the sealed enclose of FIG. 2d with the sealing strips positioned on opposite sides of the laminar sheet such that the sheet is only folded along two fold lines to form the enclosure.

Figure 5:
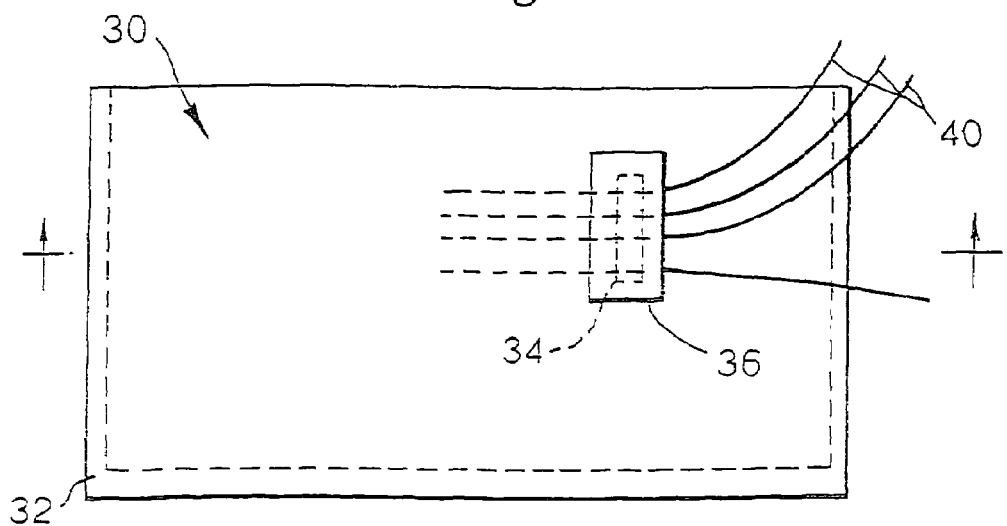
FIG. 5 shows schematically the aforementioned patch-and-window seal.
Figure 5:
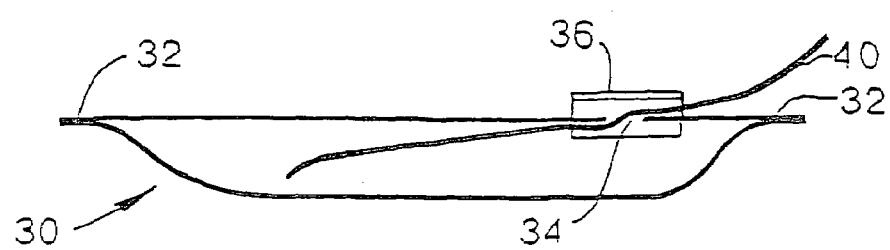

FIG. 5 shows in plan and in cross-section a plastics sheet which has been folded to form an enclosure 30 around an optical component (not shown) and has been sealed around the superposed sheet edges 32. Optical fibres 40 pass to and from the optical component inside the enclosure through an opening or window 34, which is sealed by an adhesive patch 36 of plastics film to provide the aforementioned patch-and-window seal. The optical fibres are thus sealed between the exterior surface of the enclosure and the overlying portion of the patch. In this example, the enclosure resembles a polymer film envelope, but it will be understood that the patch-and-window seal technique could also be applied to enclosures comprising a box or tray closed by a plastics film, or to enclose boxex made of metal or other relatively inflexible material. The patch may be made of and adhered by any appropriate materials, plastics films with pressure-sensitive or contact adhesives being convenient in practice.

Although the invention has been described with reference to the embodiments shown in the accompanying drawings it is to be understood that the invention is not limited to those precise embodiments and that various changes and modifications may be effected without further inventive skill and effort.

The invention claimed is:

1. A method of sealingly enclosing a space into which at least one optical fibre is fed; the method comprising: (a) providing at least one optical component connected to the at least one optical fibre; (b) providing a flexible protective sheet having a pair of sealing strips at or towards opposite ends thereof, (c) arranging the at least one optical component on the sheet; (d) folding the ends of the sheet over the at least one optical component to provide an envelope surrounding the at least one component with the sealing strips arranged in overlapping engagement on a side of the envelope with the at least one optical fibre being fed into the interior of the envelope between the sealing strips; (e) applying heat and/or pressure to the sealing strips so as to provide a sealed seam along one surface of the envelope sealingly enclosing the at least one optical fibre; and (f) sealing the sides of the envelope to provide a sealed enclosure, wherein the sealing strips are provided on a same side of the sheet, and the ends of the sheet are folded along substantially parallel fold lines to form an overlapping apex, and the apex is folded substantially flat to lie along a surface of the envelope.

2. A method of sealingly enclosing a space into which at least one optical fibre is fed; the method comprising: (a) providing at least one optical component connected to the at least one optical fibre; (b) providing a flexible protective sheet having a pair of sealing strips at or towards opposite ends thereof, (c) arranging the at least one optical component on the sheet; (d) folding the ends of the sheet over the at least one optical component to provide an envelope surrounding the at least one component with the sealing strips arranged in overlapping engagement on a side of the envelope with the at least one optical fibre being fed into the interior of the envelope between the sealing strips; (e) applying heat and/or pressure to the sealing strips so as to provide a sealed seam along one surface of the envelope sealingly enclosing the at least one optical fibre; and (f) sealing the sides of the envelope to provide a sealed enclosure, wherein the at least one optical fibre is arranged on the sheet with bends in the fibre and a straight section between the bends, and the sheet is folded at a first end along a fold line coincident with the straight section.

3. A method as claimed in claim 2 wherein the at least one optical fibre is/are arranged with a 90 degree bend in a region between the seam and the fold line at the first end.

4. A method of sealingly enclosing a space into which at least one optical fibre is fed; the method comprising: (a) providing at least one optical component connected to the at least one optical fibre; (b) providing a flexible protective sheet having a pair of sealing strips at or towards opposite ends thereof; (c) arranging the at least one optical component on the sheet; (d) folding the ends of the sheet over the at least one optical component to provide an envelope surrounding the at least one component with the sealing strips arranged in overlapping engagement on a side of the envelope with the at least one optical fibre being fed into the interior of the envelope between the sealing strips; (e) applying heat and/or pressure to the sealing strips so as to provide a sealed seam along one surface of the envelope sealingly enclosing the at least one optical fibre; and (f) sealing the sides of the envelope to provide a sealed enclosure, wherein the sheet is folded such that the seam is positioned substantially towards the centre of the sides of the envelope or towards one folded side edge thereof such that the sides of the envelope over which the at least one optical fibre is/are fed into the envelope is of sufficient shape and size to accommodate a minimum bend radius of the overlying at least one fibre.

5. A method as claimed in claim 4 wherein the shape and size of the envelope is sufficient to accommodate loops of the at least one fibre.

6. A method as claimed in claim 4 wherein the sheet is folded such that the distance between the seam and the respective fold line of the sheet towards which the at least one optical fiber is fed is sufficient to accommodate the minimum bend radius of the at least one optical fibre.

7. A method as claimed in claim 1 wherein the sheet comprises a laminate.

8. A method as claimed in claim 7 wherein the laminate comprises a moisture resistant layer.

9. A method as claimed in claim 8 wherein the moisture resistant layer comprises aluminium.

10. A method as claimed in claim 1 wherein the at least one optical component is arranged on a support and the at least one optical fibre is routed in accordance with a predetermined circuit configuration with at least one fibre end fed through the envelope for optical connection with other components.

11. A method as claimed in claim 10 wherein the at least one optical fibre is fixed with respect to the support.

12. A method according to claim 1, wherein the optical component comprises at least one optical splitter.

* * * * *

UNITED STATES PATENT AND TRADEMARK OFFICE
CERTIFICATE OF CORRECTION

PATENT NO. : 7,215,865 B2  Page 1 of 1
APPLICATION NO. : 10/514694
DATED : May 8, 2007
INVENTOR(S) : Bellekens et al.

It is certified that error appears in the above-identified patent and that said Letters Patent is hereby corrected as shown below:

On the Title Page: item 57

Abstract: Line 10: Please correct "which is sealed by all adherent"
To read -- which is sealed by an adherent --

Signed and Sealed this

Fifteenth Day of April, 2008

JON W. DUDAS
*Director of the United States Patent and Trademark Office*